Patented Dec. 20, 1938

2,140,512

UNITED STATES PATENT OFFICE 2,140,512

PROCESS OF TREATING OLEO-RESINOUS MATERIAL

McGarvey Cline, Jacksonville, Fla.

No Drawing. Application June 4, 1935,
Serial No. 24,981

15 Claims. (Cl. 260—107)

This invention relates to improvements in processes of treating oleo-resinous materials and to improvements in oleo-resin products. More particularly it relates to treating crude oleo-resins to render them readily available for shipment and use in various industries.

By the process of the present invention an oleo-resinous product is prepared which has the general advantages for transportation purposes and commercial utility of the type of product described and claimed in my Patent No. 1,945,421. In that patent a process is set forth in which oleo-resinous material is heated to distill off water and water soluble organic acids. A temperature range corresponding to 160° C. at atmospheric pressure is given as a temperature to which the material may be heated to obtain a non-corrosive, clear, transparent, non-crystallizing, liquid product. However, in the process described in detail in the following it has been found that highly desirable results are obtained without exceeding a temperature of approximately 100° C. The modification of pine oleo-resins by heat has been found to be a function of time and temperature instead of a function definitely related to a critical temperature. The solubility of the resin acids in their associated terpenes is slightly affected even by the heating operation involved in melting. It has been found that by maintaining the oleo-resins at a temperature which keeps them in a highly liquefied condition for sufficient periods of time, substantial modification of structure results. The long period of fluidity also permits substantial dehydration by gravity sedimentation, thus avoiding the higher temperatures required for dehydration by means of distillation.

One of the primary objects in emulsifying crude oleo-resins with water is to remove both volatile and non-volatile water soluble materials contained in the crude oleo-resin. This purpose can be accomplished only by avoiding evaporation as a means of separating the aqueous and oleo-resinous liquids. Complete dehydration can not be obtained by sedimentation and complete removal of corrosive water soluble acids can not be obtained by means of distillation. The passage of steam through liquefied oleo-resin for the purpose of removing volatile water soluble acids fails to accomplish their complete removal because acids of this character are produced by the contact of steam with the oleo-resinous material. Therefore, a complete removal of corrosive acids from oleo-resins can not be obtained either by washing with water followed by sedimentation, or by dehydration by means of steam distillation.

This situation has been solved in this invention by a chemical treatment with an alkaline agent sufficient in amount to substantially neutralize the highly ionized water soluble acids and removal of the highly soluble salts resulting from the neutralization, by separating the aqueous solution from the oleo-resinous material by gravity sedimentation. The slight traces of water remaining in the resulting oleo-resinous product contain traces of the salts of neutralization but are completely free from active corrosive acids. When $Ca(OH)_2$ is used as the neutralizing agent the traces of moisture in the oleo-resinous product may be slightly alkaline in their reaction. It is desirable to have them slightly alkaline so as to insure complete immunity from discoloration resulting from contact with iron. The oleo-resinous products resulting from this process show improvement from the standpoint of low viscosity and lighter color of products produced from the resin acids.

Pine gum, or oleo-resin obtained from southern yellow pine, for instance, *Pinus palustris* or *Pinus caribaea*, or other trees, is a complex mixture of volatile terpenes, resin acids, other resinous compounds, organic volatile acids, water soluble carbohydrates, and other unidentified materials. The non-volatile portions of the oleo-resin consist largely (approximately 90 percent) of isomeric and isomorphous resin acids. The remainder of the non-volatile portions consist largely of an unidentified mixture of materials generally designated as resines. The general physical properties of this complex mixture of materials is dominated by the bulk of crystalline resin acids of low solubility in the viscous liquid portions of the aggregate, which liquid portions are characterized by a corrosive acidity. The crystalline resin acids are composed of two major groups of acids identified as pimeric and sapinic acids, in the respective proportions of approximately 30% and 70%. These crystalline acids are complex unsaturated compounds and the sapinic acids are very unstable to the action of heat.

The general effects of heat upon the residual acids resulting from the distillation of oleo-resins (commercial gum rosins) has been known and applied in the arts of varnish making and other uses of rosin for a number of years, but the modification of oleo-resins by means of heat treatments at temperatures lower than those required for distillation has only recently acquired practical significance as a means of converting oleo-resins into commodities adapted to bulk shipment and storage. The preparation of the product of the present invention involves the elimination of the corrosive acidity and modification of the resin acids merely to an extent that produces an oleo-resinous product suitable for bulk shipment and storage at a minimum of cost for processing.

It can be readily shown to what extent the products prepared by the process of the present invention differ from oleo-resins that have been subjected to distillation or heat treatment at relatively higher temperatures than those used in the present process. Molecular modification is conclusively indicated by the variation in the specific rotation. A marked effect is also produced on the solubility of the associated resin acids and terpenes in each other. This is shown by the change produced in the viscosity of a given oleo-resinous material by various heat treatments.

In the usual distillation, steam distillation for instance, of oleo-resins which involves a dissociation of the component parts, namely terpenes and resin acids, a high degree of modification of the solubility characteristics of the terpenes and resins with respect to each other, is produced. If a given batch of oleo-resin is heated to produce rosin and turpentine and if after separation, the rosin and turpentine produced are mixed, the viscosity in seconds is more than twice as great as that for a similar batch that has been heat treated without dissociation of terpenes and resin acids.

The heat treatments to which oleo-resins are subjected in direct fire stills used for the production of commercial rosin and turpentine, also affect the characteristics to an extraordinary degree. Samples of commercial rosins dissolved in commercial turpentine in the exact proportions that the acids and terpenes are associated in oleo-resins used in two comparative tests, showed viscosities of 2,640 seconds, and 3,080 seconds; while the heat treated oleo-resins without substantial dissociation into their constituents showed respectively, viscosities of 235 seconds and 263 seconds. This is cited to stress the fact that the natural association of terpenes and resin acids occurring in oleo-resin constitute a basically different material from mixtures of component parts of an oleo-resin after they have been dissociated from their original natural combination. In brief, mixtures of rosin and turpentine are not oleo-resins.

An object of the present invention is to provide a method by which oleo-resinous material may be effectively rendered free from corrosive acids, and adapted to bulk shipment and storage with a minimum of change in chemical composition of the terpenes and resin acids.

The process of the present invention comprises treating oleo-resin with an alkaline solution to neutralize the highly ionized corrosive acids contained therein, maintaining the oleo-resinous material at a temperature ranging approximately from 80° to 100° C., and separating the aqueous solution of water soluble materials from the oleo-resinous materials by gravity sedimentation. The duration of the heat treatment of the oleo-resin ranges from 5 to 24 hours so as to obtain a desired degree of solubility of resin acids in their associated terpenes, in order to prevent dissociation of terpenes and resin acids, to an extent that interferes with the homogeneous fluidity of the oleo-resinous product.

When commencing with the raw material such as crude oleo-resin for instance, the latter along with the chips, pine needles, sand and other extraneous matter usually found therein, may be placed in a vessel and heated by direct or indirect steam or both without distillation and until the oleo-resin is thoroughly melted. Alkaline material, preheated if desired, is added to the melted oleo-resin and thoroughly mixed therewith to neutralize the water soluble organic acids.

One method of treating the oleo-resin with alkaline solution may be similar to that employed in a process disclosed in my copending application Serial No. 34,623, filed August 3, 1935. An apparatus in which the process is conducted in a highly efficient manner is described in the latter application and more completely in application Serial No. 20,836, filed May 10, 1935. Crude oleo-resinous material is placed in a vapor tight container and steam injected into the mass. Instead of introducing the alkaline reagent after the oleo-resin is melted, the alkaline solution may be injected with the steam, superheated if desired, to thoroughly distribute it throughout the oleo-resin during the melting thereof. The alkaline reagent is thereby effectively distributed throughout the oleo-resin in a manner which secures first contact of the alkaline agent with the highly ionized water soluble acids. This method of injecting the alkaline reagent secures the neutralization of the highly ionized acids before any of the alkaline reagent becomes available for reaction with the comparatively inactive resin acids. By routine analysis, the amount of the alkaline reagent required for the neutralization of the water soluble acids in a given batch of oleo-resin may be predetermined and the exact or the approximate calculated amount to accomplish the neutralization of these acids only may be added. In mixing oleo-resinous material and alkaline reagents, it is noted that heating of the said material with or without direct steam increases the fluidity thereof and while in fluid condition ease of mixing is promoted.

Solutions of hydroxides of the alkaline earth metals, such as calcium or barium hydroxides, or alkali metal hydroxide or carbonates or bicarbonates such as those of sodium or potassium or of ammonia may be used as neutralizing agents. Such materials are commonly termed basic. Mixtures of any two or more of the above neutralizing materials may also be used.

Any alkaline reagent may be used but the selection of the most suitable one depends upon the requirements of the consuming industry for which the oleo-resins are being processed. The soap and paper size industries use the resin acids for the production of the soluble sodium resinates. For their use, therefore, $Na(OH)$ or $Na_2(CO_3)$ would be the preferable alkaline reagents, since exact control in their application would be unnecessary. In such a case a surplus of alkali over what is required for the neutralization of the water soluble acids could be added with beneficial effect upon the oleo-resinous product as a means of increasing its fluidity and immunity to recrystallization of resin acids. In many cases where alkaline reagents of the alkali metals are used, it is desirable to inject them in solution with brine instead of fresh water since sodium resinates are not substantially soluble in salt water and would therefore, be left in solution with the oleo-resinous material after the aqueous solutions were withdrawn. Their use in solution with brine also inhibits their action upon the resin acids.

The varnish and other industries not concerned with the conversion of resin acids into soluble soaps generally treat the resin acids with alkalies of the alkaline earth metals. The alkaline material most generally used by these industries is Ca(OH)$_2$. In processing oleo-resins for consumption by these industries, Ca(OH)$_2$ would be the most desirable alkaline reagent. Ba(OH)$_2$ would also be suitable, and sometimes preferable due to its greater solubility and reactivity with resin acids under the temperature conditions used in this process. Both of these hydroxides produce insoluble resin soaps and are only slightly reactive with oleo-resins under the temperature conditions of the process. This makes them generally desirable for the purposes of this process when the use of the processed material is not known. Slight traces of calcium or barium resinates can not be regarded as objectionable adulterations of resin acids. Since only slight traces of these resinates can be introduced under the conditions of the process, their use is generally desirable. Both of the above alkaline earth bases may be used together to advantage, or singly in solution with washing water. Powdered basically reacting calcium or barium compounds may be added to a batch, or milk of lime may be injected.

The alkaline reagent is preferably applied to the oleo-resin in dilute solutions. The stock solution of alkaline reagent may be of any desired strength preferably, a fairly concentrated solution. A definite amount of the stock solution, however, may be injected gradually during the period of melting and agitation. As the stock solution is injected it may be diluted with condensed steam and also by the free water contained in the crude oleo-resin. An average barrel of crude oleo-resin contains approximately 30 pounds of free water, and it takes approximately 25 pounds of steam to liquefy a barrel.

The corrosive acids contained in a barrel require, say, 11 grams of NaOH to neutralize them, or approximately 10 grams of Ca(OH)$_2$. If a saturated cold water solution of Ca(OH)$_2$ is being used for neutralization, 1½ gallons of the solution would have to be injected per barrel of oleo-resin being treated. If a saturated hot water solution of Ca(OH)$_2$ were being used, it would require 3½ gallons per barrel. The high solubility of NaOH in water would permit concentrated stock solutions of this alkali. Such solutions, however, would only be used for the purpose of lessening the amount of additional water injected. Irrespective of the concentration of the stock solution, the strength of the solution in contact with the oleo-resin would always be very much diluted by the relatively large volume of water present in the oleo-resin.

During the neutralization treatment the temperature of the oleo-resin is preferably maintained between the temperature at which the resins become liquid and the boiling point of water or slightly above under a corresponding increased pressure. After neutralization and washing, the melted oleo-resins are separated from the resulting aqueous solution of salts and other material. If suspended matter is present in the oleo-resin, it is separated by filtration. This is effectively accomplished by displacing the oleo-resin in the treating vessel with brine and during the displacing process filtering the oleo-resin through a series of filters preferably of increasing fineness as set forth and shown in the above-mentioned application Serial No. 20,836. The filtered oleo-resin material is passed to a separator where oleo-resins separated from aqueous solutions may be withdrawn into a vessel where its temperature treatment may preferably be continued.

The subsequent heat treatment of the separated oleo-resin is conducted at a relatively low temperature of around 100° C. for from five to twenty-four hours under slight pressures to prevent vaporization. A temperature ranging between approximately 80° and 100° C., may be employed for the periods mentioned for maintaining the oleo-resinous materials in a highly fluid condition.

The entire neutralizing and heat treating process is preferably carried out in vapor tight apparatus and out of contact with air. In some cases the oleo-resin, after treatment with alkaline reagents, may be placed in a vessel equipped with a reflux condenser connected to pass the condensate through a separator which removes water and returns such terpenes as may be contained in the condensate to the oleo-resin being processed. In this instance the temperature may be such that a completely dehydrated product is obtained in less time and with much less dissociation of terpenes than occurs when water soluble acids are removed by distillation. By reducing to a minimum the dissociation of terpenes and resin acids, the changes in characteristics from those of the product prepared without partial or any distillation, are relatively slight.

The use of the present process results in many advantages. Besides obtaining an oleo-resin product that is substantially crystal free, highly fluid, substantially free from corrosive acids, clear, and transparent, it is found to be less darkened in color. In the process of the present invention, there is a much lower consumption of fuel, and less loss of volatile constituents of oleo-resin. No expensive equipment resistant to acid corrosion is necessary. Storage tanks required for the accumulation of oleo-resin after filtering and treatment with the alkaline reagent need not be constructed of the more expensive metals such as aluminum or other acid resisting material.

It will be clear from the aforegoing that the materials identified as alkaline reagents and neutralizing agents are those which serve particularly to obtain the results of the present process while yet reducing the corrosive action of the water-soluble acids.

What I claim is:

1. In a process of treating crude oleo-resins obtained from living trees and prior to the treatment of such oleo-resins to obtain rosin and turpentine therefrom, the said crude oleo-resins containing water-soluble acid material, heating and melting the said crude oleo-resins and maintaining the said oleo-resins in fluid condition while distributing by injection of steam an alkaline reagent throughout the crude oleo-resins in sufficient amount to neutralize, to a substantial extent, only the water-soluble acids contained in the said crude oleo-resins, filtering the resulting oleo-resinous material and separating the latter material from the resulting solution of substantially neutralized acids to obtain a fluid, non-corrosive, oleo-resinous product.

2. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent in amount sufficient to effect a reaction with such a substantial portion of the said water-soluble acids that the aggregate is freed of corrosive acids, the amount of reagent added being insufficient to affect substantially the water-insoluble resin acids in the aggregate.

3. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent while heating the aggregate to effect a reaction with substantially all of the said water-soluble acids, the amount of reagent added being insufficient to affect substantially the water-insoluble resin acids in the aggregate.

4. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent while heating the aggregate in a closed container out of contact with air, to effect a reaction with substantially all of the said water-soluble acids, the amount of reagent added being insufficient to affect substantially the water-insoluble resin acids in the aggregate.

5. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent to effect a reaction with substantially all of the said water-soluble acids, the amount of reagent added being insufficient to affect substantially the water-insoluble resin acids in the aggregate, and filtering the resulting oleo-resin aggregate to remove therefrom undesirable solid or semi-solid material insoluble in oleo-resins and ordinarily associated with pine tree exudates.

6. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent to effect a reaction with substantially all of the said water-soluble acids, the amount of reagent added being insufficient to affect substantially the water-insoluble resin acids in the aggregate, filtering the resulting oleo-resin aggregate and separating the oleo-resins from products of the said reaction, and heating the separated oleo-resins for a period sufficient to increase the solubility of resin acids in the terpenes associated therewith, to thereby obtain a clear, transparent, non-corrosive, oleo-resinous product.

7. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent to effect a reaction with substantially all of the said water-soluble acids, the amount of reagent added being insufficient to affect substantially the water-insoluble resin acids in the aggregate, separating the oleo-resins from products of the said reaction, and removing moisture from the separated oleo-resins to obtain a dehydrated, non-corrosive, oleo-resinous product.

8. In a process of treating crude oleo-resins obtained from trees and prior to the treatment of such oleo-resins to obtain rosin and turpentine therefrom to remove water-soluble acids therefrom, the said crude oleo-resins containing the aggregate of pine tree exudates including organic, ionizable, water-soluble acids, the steps comprising thoroughly mixing with the said aggregate containing said water-soluble acids an alkaline reagent to effect a reaction with substantially all of the said water-soluble acids, the amount of reagent added being insufficient to affect substantially the water-insoluble resin acids in the aggregate, and removing from the resulting mixture products of the reaction.

9. In a process of treating crude oleo-resins at the stage when it has been removed from living trees and prior to treating the oleo-resins to separate the same into rosin and turpentine, the said crude oleo-resins containing the aggregate of pine tree exudates including water-soluble acid constituents, mixing the said aggregate in the said stage together with an alkaline reagent by injection of steam, the said reagent being introduced in an amount sufficient to neutralize to a substantial extent the said water-soluble acids present in the aggregate but substantially none of the water-insoluble resin acids contained in the said aggregate to thereby obtain a non-corrosive, oleo-resin product transportable in metal containers without becoming discolored by contact with the metal.

10. In a process of treating crude oleo-resins at the stage when it has been removed from living trees and prior to treating the oleo-resins to separate the same into rosin and turpentine, the said crude oleo-resins containing the aggregate of pine tree exudates including resin acids and water-soluble acid constituents; liquefying the said aggregate and distributing an alkaline reagent by the injection of steam in the said liquefied aggregate to neutralize, to a substantial extent, the water-soluble acids present in the aggregate but substantially none of the resin acids contained in the said aggregate, filtering the resulting oleo-resins and separating the latter from the alkalized water-soluble acids to obtain a non-corrosive oleo-resin product transportable in metal containers without becoming discolored by contact with the metal.

11. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent comprising a basic alkali metal compound in amount sufficient to effect a reaction with such a substantial portion of the said water-soluble acids that the aggregate is freed of corrosive acids, the amount of reagent added being insufficient to affect substantially the water-insoluble resin acids in the aggregate.

12. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent comprising a basic alkaline earth metal compound in amount sufficient to effect a reaction with such a substantial portion of the said water-soluble acids that the aggregate is freed of corrosive acids, the amount of reagent added being insufficient to affect substantially the water-insoluble resin acids in the aggregate.

13. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent containing calcium hydroxide in amount sufficient to effect a reaction with such a substantial portion of the said water-soluble acids that the aggregate is freed of corrosive acids, the amount of reagent added being insufficient to affect substantially the water-insoluble resin acids in the aggregate.

14. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent containing alkali metal hydroxide in amount sufficient to effect a reaction with such a substantial portion of the said water-soluble acids that the aggregate is freed of corrosive acids, the amount of reagent added being insufficient to affect substantially the water-insoluble resin acids in the aggregate.

15. In a process of treating crude oleo-resins to provide a substantially non-corrosive oleo-resin product substantially immune to discoloration by contact with metal, the said crude oleo-resin being obtained from trees, and the said crude oleo-resins containing the aggregate of pine tree exudates including organic, ionizable, water-soluble acids, the procedure to be used prior to the treatment of such oleo-resins to obtain rosin and turpentine therefrom, comprising thoroughly mixing with the said aggregate containing the said organic, ionizable, water-soluble acids an alkaline reagent containing alkali metal carbonate in amount sufficient to effect a reaction with such a substantial portion of the said water-soluble acids that the aggregate is freed of corrosive acids, the amount of reagent added being insufficient to affect substantially the water-insoluble resin acids in the aggregate.

McGARVEY CLINE.